Figure 1:
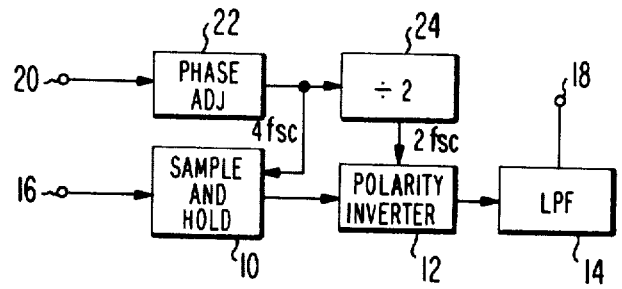

United States Patent [19]

Clemens

[11] 4,286,283
[45] Aug. 25, 1981

[54] TRANSCODER

[75] Inventor: Jon K. Clemens, Skillman, N.J.

[73] Assignee: RCA Corporation, New York, N.Y.

[21] Appl. No.: 105,548

[22] Filed: Dec. 20, 1979

[51] Int. Cl.³ .................................................. H04N 9/42
[52] U.S. Cl. ...................................................... 358/11
[58] Field of Search ......................................... 358/11

[56] References Cited

U.S. PATENT DOCUMENTS 3,891,994  6/1975  Phillips et al. ..................... 358/11

Primary Examiner—Richard Murray
Attorney, Agent, or Firm—E. M. Whitacre; J. S. Tripoli; R. G. Coalter

[57] ABSTRACT

Samples of the amplitude of a quadrature amplitude modulated (QAM) subcarrier signal are taken at times corresponding to each axis crossing of each of the two quadrature related signal components. The polarity of alternate ones of the samples is inverted and the signal is reconstructed from the inverted and non-inverted samples whereby the phase of one of the signal components is reversed without alteration of the phase of the other. Where the QAM signal is a television chrominance signal, means are provided for periodically inhibiting inversion of the samples on alternate lines whereby PAL type chrominance signals may be converted to or from NTSC or NTSC "like" chrominance signals.

17 Claims, 12 Drawing Figures

TRANSCODER

This invention relates to transcoders and particularly to a transcoder for reversing the phase of one of two signal components of a quadrature amplitude modulated signal.

Quadrature double sideband suppressed carrier amplitude modulation (QDSSC-AM, hereinafter QAM) is utilized for the transmission of color difference signals R-Y and B-Y in both the NTSC and the PAL color television systems and has also been proposed for transmission of position differences signals L-R and F-B in quadraphonic stereo systems (see, generally, IEEE Transaction on Broadcast and Television Receivers, Vol. BTR-19, No. 4, November, 1973). Since the carrier is suppressed in QAM, it is necessary that it be regenerated in a receiver to be able to synchronously detect and recover the original color (or position) difference signals. To facilitate this regeneration, the QAM signal in both the NTSC and PAL color television systems includes a burst component of a few cycles of subcarrier frequency transmitted during the "back porch" interval of the horizontal synchronizing period. In the proposed quadraphonic transmission systems carrier regeneration may be provided by means of a continuously transmitted low level pilot signal having a predetermined frequency and phase relationship with the subcarrier.

It is known that one may utilize a regenerated subcarrier for processing an analog type of QAM signal in such a manner as to reverse the phase of one of the two difference signal components. One way of doing this is to multiply the QAM signal with a suitably phased double subcarrier frequency reference signal as shown for example, in U.S. Pat. No. 3,968,514 which issued to Narahara, et al., July 6, 1976. That approach, however, results in the production of triple subcarrier frequency products in the output signal which are relatively difficult to remove by filtering.

An alternative to the "multiplier" approach is the "demodulator-remodulator" technique disclosed in the U.S. patent application of Carnt, et al., Ser. No. 822,659 which was filed Aug. 8, 1977 and issued Apr. 29, 1980, as U.S. Pat. No. 4,200,881. There the analog QAM signal components are synchronously demodulated to base band, the polarity of one base band component is inverted and then (after base band filtering) both components are remodulated on respective quadrature related subcarriers. The difficulty with this approach is that the base band filtering requires the use of relatively high valued circuit elements which increases the size and cost of the transcoder and makes construction in integrated circuit form relatively more difficult.

The present invention is directed in one respect to meeting the need for a transcoder which avoids the problems associated with base band filtering and in which principal undesired products of the transcoding process occur at a frequency greater than three times the subcarrier frequency.

In accordance with one aspect of the invention, a transcoder for reversing the phase of one of two signal components of a quadrature amplitude modulated signal includes means for producing samples of the amplitude of the subcarrier at times corresponding to each axis crossing of each of the signal components, means for inverting alternate ones of the samples and means for reconstructing the subcarrier from the inverted and non-inverted samples.

The invention is directed in another aspect to meeting the need for a transcoder for converting a chrominance signal of a first form to one of a second form wherein one of said forms conforms to PAL standard chrominance and burst phasing, and, the other conforms to a standard such as NTSC or the "NTSC-like" standard proposed by Carnt, et al., in their aforementioned application.

In accordance with a further aspect of the invention, a conversion between chrominance signals of the forms noted above may be facilitated by periodically inhibiting polarity inversion of alternate ones of the samples.

IN THE DRAWINGS

Figure 2:
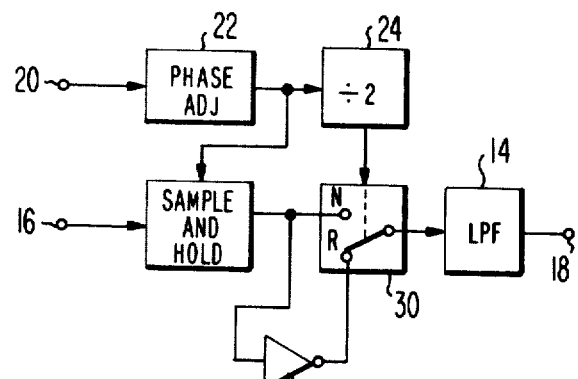
Figure 3:
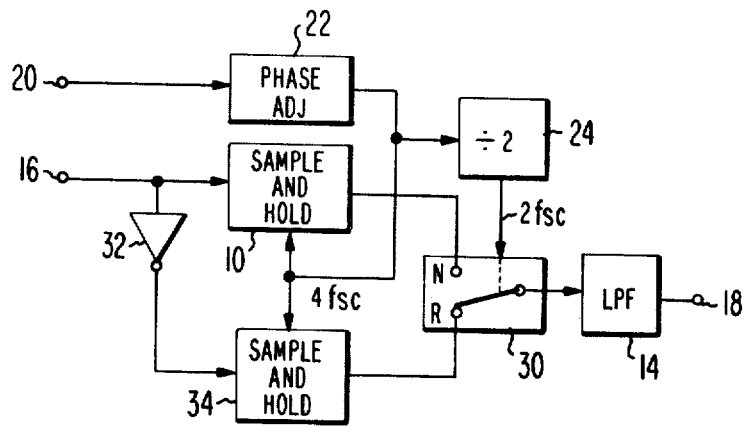
Figure 5:
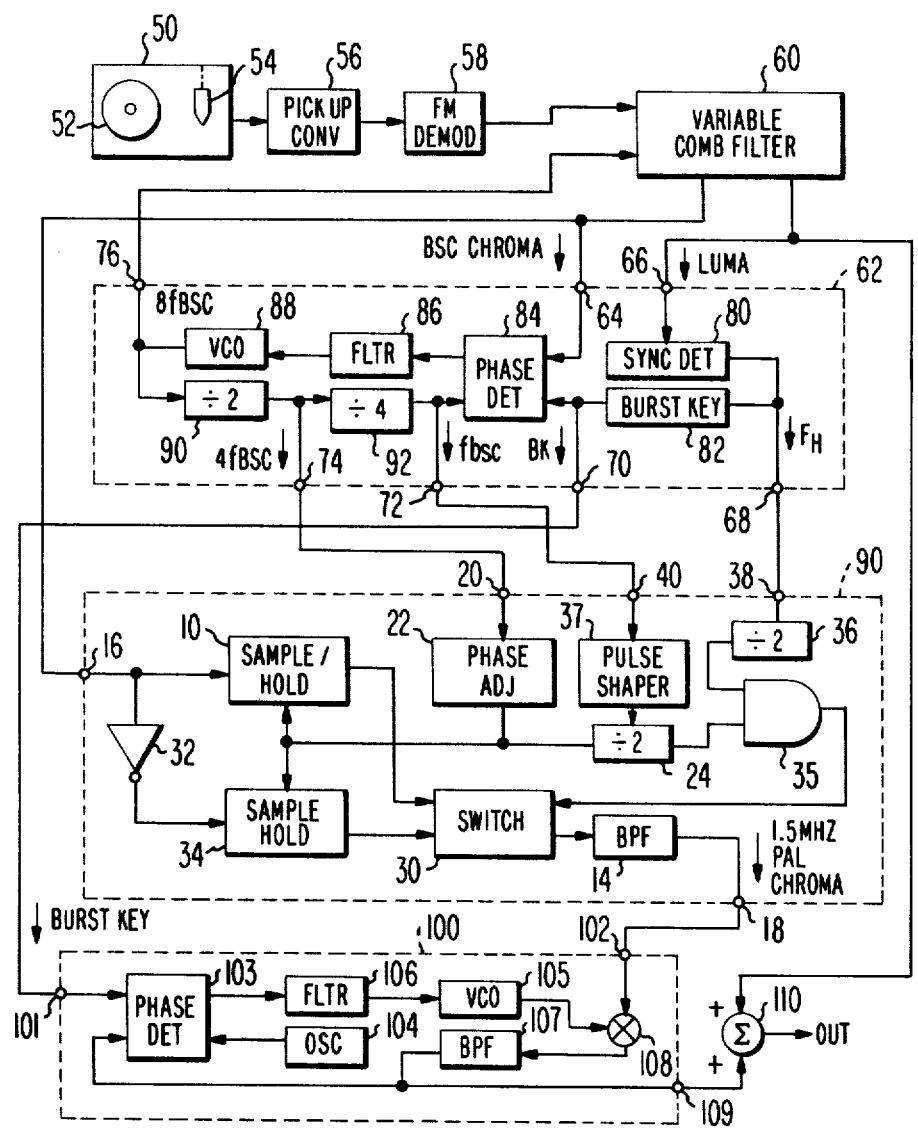
Figure 6:
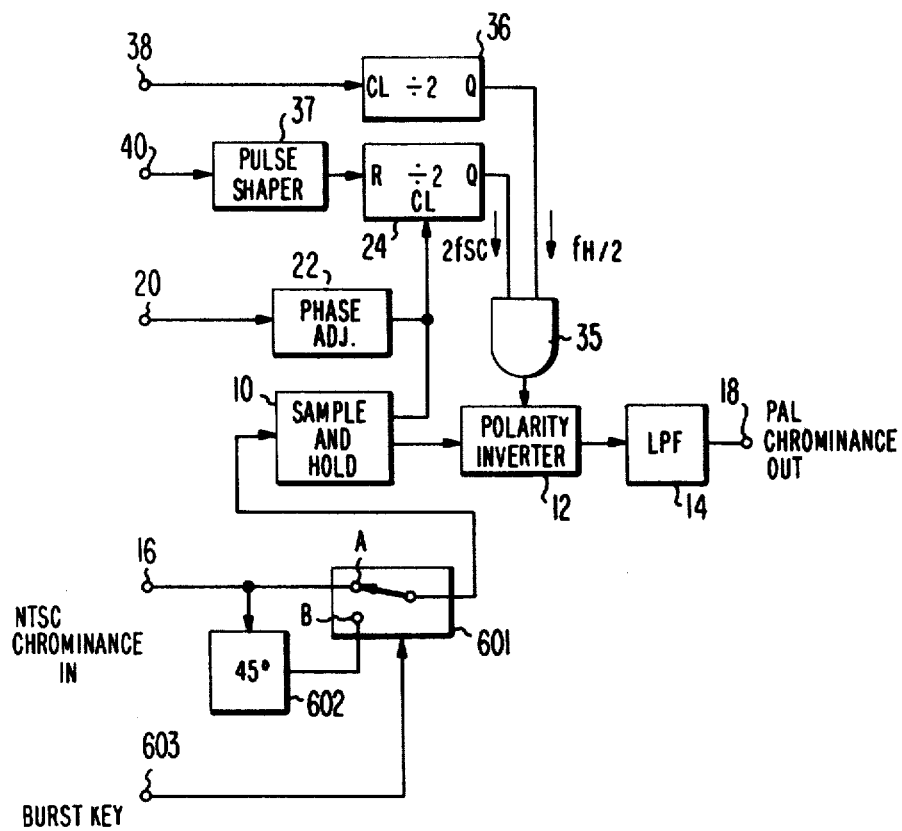
Figure 7:
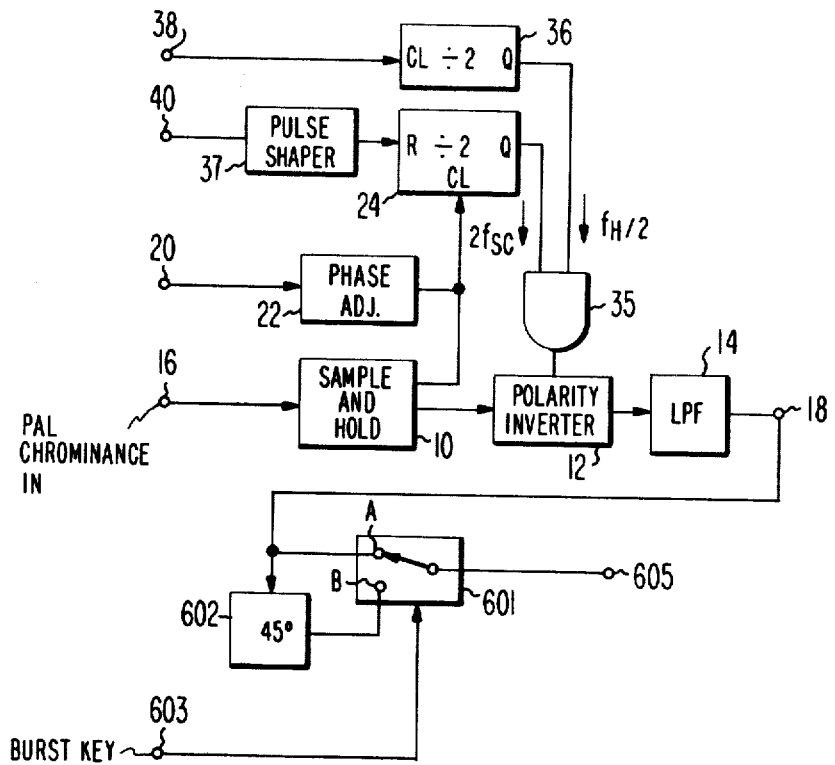
Figure 8:
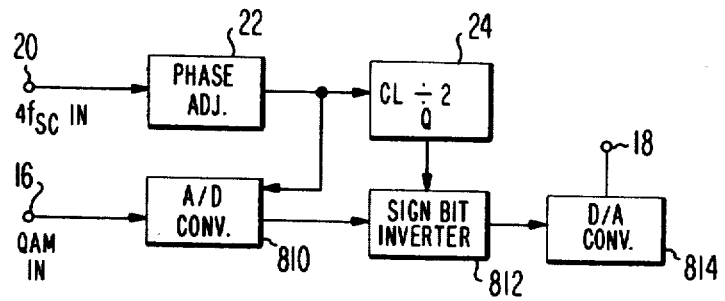

FIGS. 1, 2 and 3 are block diagrams of transcoders embodying the invention;

FIGS. 4A-E are waveform diagrams illustrating certain aspects of operation of the transcoders of FIGS. 1-3;

FIG. 5 is a block diagram of a video disc player apparatus employing a transcoder of the invention modified for providing chrominance signal conversion; and FIGS. 6, 7 and 8 are block diagrams of chrominance transcoders embodying the invention.

In FIG. 1 a sample and hold circuit 10, a sample inverter circuit 12 and a low pass filter 14 are connected in cascade in that order between a QAM input terminal 16 and a transcoder output terminal 18. A reference subcarrier input terminal 20 is connected to the input of a phase adjusting circuit 22 which is connected at the output thereof to a control or enabling input of the sample and hold circuit and also, via a divider 24, to an enabling or control input of the sample inverter circuit.

In transcoding applications where the QAM signal is of analog form, sample and hold circuit 10 may be of conventional design. A suitable implementation would be a transmission gate arranged to charge a holding capacitor with the QAM signal when the gate is enabled, the charge being retained when the gate is disabled. It is not necessary, however, that the holding time equal the entire period that the gate is disabled. In other words, the sample and hold circuit may, if desired, be reset to some reference level prior to the taking of a new sample. Other suitable sample and hold circuits featuring improved accuracy, reduced aperture time and minimized settling time are described, for example, in "Applications of Operational Amplifiers—Third Generation Techniques" by J. G. Graeme published by McGraw-Hill Book Company in 1973, pp. 132-139.

The purpose of sample and hold circuit 10 is to produce samples of the amplitude of the QAM signal applied to terminal 16 at times corresponding to each axis crossing of each of the two quadrature related components of the QAM signal. The reason that samples are taken at axis crossings of the component signals is that it is at that instant of time that the QAM signal amplitude exactly equals that of one of its two individual components. The significance of this may be more fully appreciated by considering waveform B of FIG. 4. There, the signal waveform R represents the QAM signal at terminal 16 which is the resultant vector sum of the two signal components U and V. Component U is shown as a sinewave of unit amplitude and component V is shown as a quadrature related sinewave of half unit amplitude lagging U by 90°. Since in quadrature modulation the U and V components always differ in phase by 90°, any sample taken of R when U is zero will represent the polarity and magnitude of only the V component. Similarly, any sample taken of R when V goes through a zero crossing will represent the polarity and magnitude of only the U component of R.

The purpose of phase adjuster 22 is to control precisely when sample and hold circuit 10 is enabled so that the samples produced alternately represent the U and V components of R. The input to phase adjuster 22 is a regenerated reference subcarrier of four times the QAM subcarrier frequency. Where the QAM signal is a television chrominance signal the reference signal would be phase locked in the conventional manner to the color burst component of the chrominance signal. Where the QAM signal is used for position difference signal transmission as previously mentioned the reference subcarrier would be phase locked at a multiple of the pilot signal frequency to thereby have a fixed phase relation to the subcarrier and a frequency of four times the subcarrier frequency.

Figure 4:
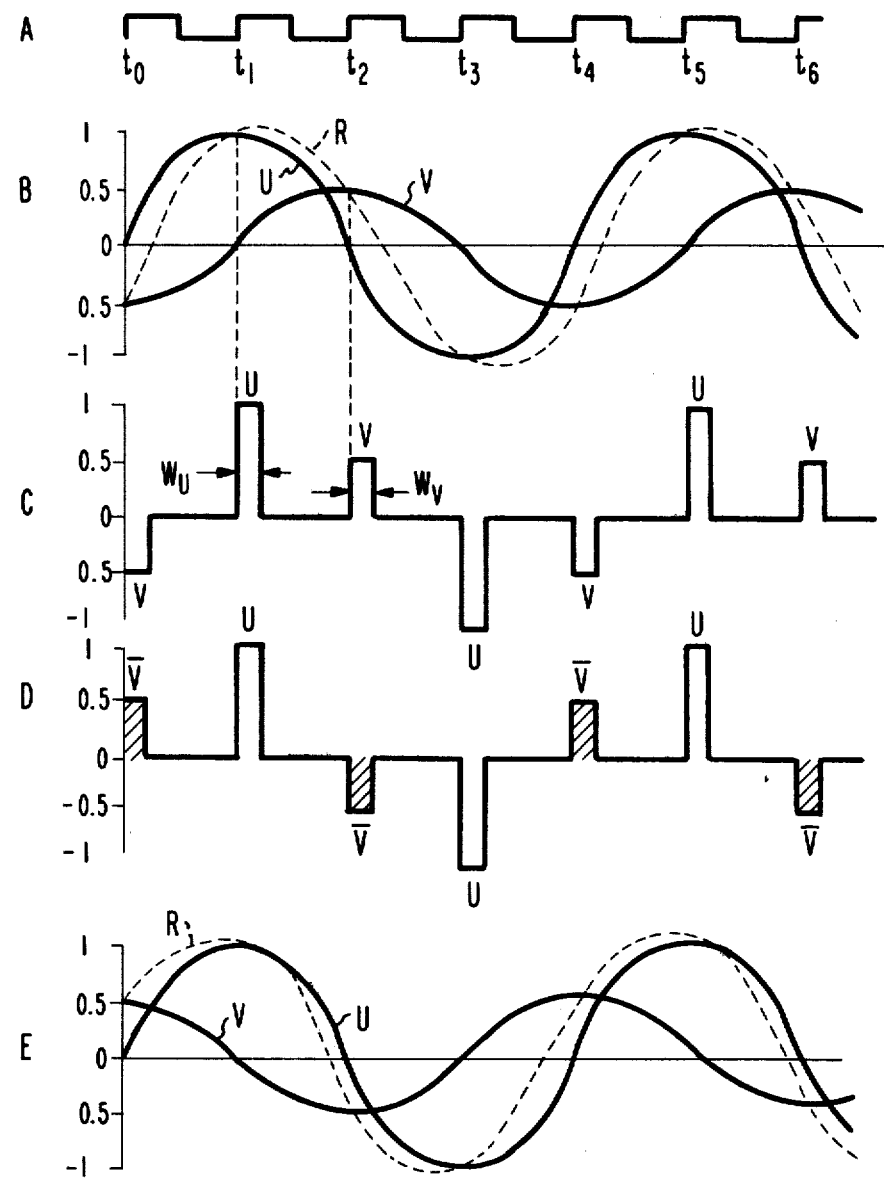

Phase adjustor 22 (which may be a conventional lead or lag network) should be adjusted by an amount such that transitions (or peaks) of the phase shifted quadruple frequency reference subcarrier ($4f_{sc}$) coincide with axis crossings of the QAM signal components. If the regenerated subcarrier exhibits this property after frequency multiplication then phase adjuster 22 may be omitted. Waveforms A and B of FIG. 4 illustrate the preferred phase relationship between the U and V components of R and the output of phase adjuster 22. Note that at even numbered positive transistions ($t_0, t_2, t_4$, etc.) of the phase adjusted reference subcarrier (waveform A) the U component of R is zero and the V component equals R. At all odd numbered positive transistions ($t_1, t_3, t_5$, etc.) the V component is zero and the U component of R equals R.

As shown in waveform C sample and hold circuit 10 produces samples of the component U of width $W_u$ and samples of the component V of width $W_v$. It is not necessary that $W_u$ be equal to $W_v$. In fact, in cases where one may wish to alter the relative amplitudes of U and V, one may do so by separately pulse width modulating the samples, as for example, by varying the holding time of sample and hold circuit 10. It is thus a feature of the invention that, in addition to reversing the phase of one of the QAM signal components without alteration of the other, one may also vary the amplitude of one of the QAM signal components independently of the other.

In cases where it is desired to preserve with high accuracy the relative magnitudes of the U and V components it is preferred to set $W_u$ equal to $W_v$ rather than the alternative of scaling the amplitudes of the samples in proportion to the differences in $W_u$ and $W_v$. To put it another way, a given relationship between U and V can be maintained by control of two parameters of the samples, namely, height and width. By maintaining the product of these parameters constant for each of U and V, it is possible upon reconstruction of the QAM signal to accurately preserve the original amplitude relationships between U and V while at the same time reversing the phase of one of the components. This may be achieved in accordance with a further aspect of the invention by maintaining equal gain through the cascade connection (10, 12, 14) for U and V samples and letting $W_u = W_v$. In cases where amplitude control by sample width modulation is not needed and where maximum conversion gain upon reconstruction of the sampled signal is desired it is preferred that the sample width for both U and V be substantially equal to one quarter of the QAM subcarrier frequency which is the same as one complete period of the reference subcarrier frequency $4f_{sc}$. If this is done, then there would be no dwell at the zero level between samples as in waveform C but rather a stair step type waveform would be produced with the amplitude of each sample remaining constant until the instant the next sample is taken.

Waveform D illustrates operation of sample inverter 12 which, controlled by divider circuit 24, inverts the polarity of alternate ones of the samples produced by sample and hold circuit 10. As previously explained, all even numbered samples represent only the V component of R since they are taken when U is zero. Divider 24 divides the reference subcarrier signal of $4f_{sc}$ by two thereby supplying an enabling signal of frequency $2f_{sc}$ to inverter circuit 12. Since circuit 12 is enabled at a rate of exactly half of the sample rate (4 fsc) every other sample (V) will be inverted but intermediate samples (U) will not be inverted.

In order to insure that the desired sample is inverted (in this case V) it is preferable that divider 24 be suitably initialized during the start of the transcoding operation or, alternatively, that means be provided for reversing the phase of its output relative to waveform A. It would be convenient where the QAM signal is a television chrominance signal to perform this initialization (i.e., resetting, presetting, etc.) of divider 24 during the color burst interval since at that time precise vector relationships are known. Alternatively, initialization may be done once each period of the QAM signal as shown and described subsequently.

Low pass filter 14 provides the means by which the QAM subcarrier may be reconstructed from the inverted (V) and non-inverted (U) samples produced at the output of inverter circuit 12. Referring now to waveform E of FIG. 4 the components U and V are shown as smoothed separate sine waves which would result if the U and V components were filtered by separate low pass filters. If the U and V samples were so separated and separately filtered one could then sum the filtered outputs to provide the resultant vector R which, as will be recognized in comparison with waveform B, corresponds to the original QAM signal with the phase of one component (V) reversed.

There are three significant problems with the separate component filtering approach to reconstructing the QAM signal. First, it would be necessary to provide means for steering alternate samples to respective filters and this in addition to the requirement for two filters, adds to the cost and complexity of the transcoder. Secondly, different gains or losses in the filters could result in unbalancing the initial amplitude relationship between U and V. Thirdly, the filter cutoff frequencies which would be required would be less than twice the subcarrier frequency ($2f_{sc}$) which further complicates the filtering problem. Needless to say, undesired double frequency transcoding products are even more difficult to remove by filtering than the undesired triple subcarrier frequency products characteristic of the previously discussed "multiplier" or "modifier" type of non-baseband QAM transcoder.

All of the above mentioned difficulties may be overcome by use of a single low pass filter 14 for reconstructing the QAM signal. Since only one filter is involved the U and V components will be treated equally in terms of both amplitude and phase. Moreover, the filter cutoff frequency may be double that of the two-filter summer approach and the cutoff frequency may be higher than that required to remove triple frequency products from modifier type transcoder. As a practical matter the lowest dominant undesired transcoding product occurs at the sampling rate of four times the subcarrier frequency and so the filter size, cutoff frequency accuracy and stop band slope requirements are all reduced.

FIG. 2 illustrates one way in which the sample inverter circuit 12 of FIG. 1 may be implemented and interfaced with divider 24, sample and hold circuit 10 and low pass filter 14. Specifically, the output of divider 24 is connected to control a single pole two position switch 30. Illustratively, switch 30 may comprise a pair of transmission gates controlled by the true (Q) and complemented (Q) outputs of divider 24. When in position N (normal or non-invert) switch 30 connects the output of sample and hold circuit 10 to the input of low pass filter 14. When in position R (reverse polarity or invert) switch 30 couples the output of sample and hold circuit 10 to the input of low pass filter 14 via an inverting amplifier 32.

The general operation of the transcoder of FIG. 2 is substantially the same as in the discussion of FIG. 1 with switch 30 and inverting amplifier 32 performing the function of sample inverter circuit 12. One difficulty with the arrangement of FIG. 2 is that abrupt changes in voltage may occur at the output of sample and hold circuit 10 (see waveform C of FIG. 4). To accommodate these step function voltage changes it is preferable that amplifier 32 exhibit a slew rate and a settling time which are negligible compared with the sample width, otherwise, the V samples which pass through amplifier 32 may be distorted.

The arrangement of FIG. 3 reduces the slew rate and settling time requirements on amplifier 32 by placing it in a portion of the transcoder where the signals are continuous rather than discrete. Specifically, inverting amplifier 32 is connected at its input to input terminal 16 and at its output to the input of a second sample and hold circuit 34. The enabling or control input of circuit 40 34 is connected to the output of phase adjuster 22 so that the two sample and hold circuits operate simultaneously the only difference being that one (10) takes non-inverted samples of the QAM signal while the other (34) takes inverted samples. Switch 30 then operates alternately to select the normal (N) or reversed (R) samples which are then reconstructed by low pass filter 14 as previously described to provide the transcoded QAM output signal.

To assure substantially equal processing of the U and V components it is desirable that the product of the gain and sample width of circuit 10 equal that of circuit 34. In FIG. 3, as illustrated, only the circuit gain needs to be balanced since both circuits receive the same sample pulse width. This, however, is not essential to achieve balanced treatment of the U and V components and, if desired, the sample pulses may be of different widths and the gains of the sample and hold circuits may also differ. Balancing may be done, as previously explained, by setting the product of the sample width and gain through one path equal to that of the other path. It is further desirable that means (e.g. delay equalizers) be provided for equalizing the phase shift or delay through the two signal paths to assure maximum accuracy in generation of the true and inverted samples.

FIG. 5 illustrates how the transcoder of the invention may be modified for converting a chrominance signal of the type in which the phase of the U and V color difference subcarrier components is constant from line-to-line to one of the type in which the phase of the V component alternates from line-to-line. FIG. 5 also illustrates a desirable method of interfacing the transcoder with a video disc player for producing PAL standard output video signals from video disc recordings of the standard proposed by Carnt et al., in U.S. patent Application Ser. No. 822,659, entitled "VIDEO DISC SYSTEMS" filed Aug. 8, 1977 and which issued Apr. 29, 1980, as U.S. Pat. No. 4,200,881.

There are three salient features of the Carnt, et al. PAL recording standard relevant to the video disc player of FIG. 5. The first is that the PAL subcarrier is "de-switched", that is, the normal phase alternation by line of the V component of the chrominance subcarrier is inhibited for recording purposes. Secondly, the chrominance subcarrier frequency is shifted lower in frequency from nominally 4.43 MHz to about 1.52 MHz and, in effect, "buried" within the luminance band. Thirdly, chrominance burst is recorded at a constant phase angle of 45° relative to the U and V subcarriers so that burst exhibits substantially equal U and V components.

In FIG. 5 the transcoder is arranged to provide line-by-line reversal of the chrominance V component at the buried subcarrier frequency. This is done prior to time base correction and conversion of the subcarrier to PAL standard. Since burst includes equal U and V components, the PAL type "swinging" burst is automatically formed by the transcoder with the periodic reversal of the V component.

It may be noted that if burst had no V component, as in the NTSC standard, then reversal of the V component phase would have no affect on the burst phase. Accordingly, if one wished to apply the principles of the present invention to conversion of a chrominance signal with NTSC burst phasing to one of PAL format, it would be necessary to suitably change the mode of operation of the transcoder during the burst interval. This could be done, as an example, by providing means for phase shifting the chrominance signal by 45° during the burst interval, thereby resulting in a Carnt, et al. type of burst phasing which, as previously explained, is automatically converted to the PAL swinging burst form as the phase of the V component is alternated. This is discussed in more detail in connection with the example of FIG. 8.

The video disc player in FIG. 5 comprises a turntable 50 for rotating video disc 52 and a pickup transducer 54 for recovering video information from the disc. Illustratively, it will be assumed that the player is intended for use with a record in which information is stored in the form of topological variations and recovered by sensing capacitance variations between transducer 54 and the record 52. It will be appreciated, however, that the transcoder in accordance with the present invention may be used in connection with other types of disc players, tape players, camera equipment, frame storage units, transmission systems, etc. For purposes of illustration, it will be assumed that disc 52 is recorded with video information in the previously mentioned Carnt, et al. format.

The output of transducer 54 is coupled to the input of a pickup converter circuit 56 which comprises a capacitance-to-voltage converter responsive to capacitance variations between a stylus in transducer 54 and the record being played for producing an FM output signal voltage representative of the recorded information.

Suitable circuits for implementing the capacitance-to-voltage conversion function of pickup circuit 56 are well known. See, for example, U.S. Pat. No. 3,783,196 entitled "HIGH-DENSITY CAPACITIVE INFORMATION RECORDS AND PLAYBACK APPARATUS THEREFOR" which issued to T. O. Stanley, Jan. 1, 1974, U.S. Pat. No. 3,972,064 entitled "APPARATUS AND METHODS FOR PLAYBACK OF COLOR PICTURES/SOUND RECORDS" which issued to E. O. Keizer, July 27, 1976, and U.S. Pat. No. 3,711,641 entitled "VELOCITY ADJUSTING SYSTEM" which issued to R. C. Palmer, Jan. 16, 1973.

Video FM demodulator circuit 58 converts the FM signal produced by pickup circuit 56 to a video output signal. The video signals recorded on the disc are in "buried subcarrier" (BSC) format rather than the conventional NTSC format. As explained in the Carnt, et al. application, (see also U.S. Pat. No. 3,872,498 which issued to D. H. Pritchard, Mar. 18, 1975), in the BSC format chrominance information is represented by a color subcarrier of the general form employed in the well known NTSC format. However, the chrominance component in the BSC format is not located in the high end of the luminance signal video band, as in NTSC, but rather is buried in a lower portion of the video band. An illustrative subcarrier frequency choice is in the vicinity of 1.52 MHz, with the color subcarrier side bands extending ±500 KHz thereabout and with the luminance signal band extending well above the highest color subcarrier frequency (to 3 MHz, for example).

FM demodulator 58 illustratively may be of the pulse counting type or of the phase lock loop (PLL) type. A suitable pulse counting type FM demodulator is disclosed in U.S. Pat. No. 4,038,686 entitled "Defect Detection And Compensation" which issued to A. L. Baker, July 26, 1977. An FM demodulator of the phase lock loop type is described in the U.S. Patent Application, Ser. No. 984,013 of T. J. Christopher, et al., entitled "FM SIGNAL DEMODULATOR WITH DEFECT DETECTION" which was filed Oct. 2, 1978 and issued May 13, 1980, as U.S. Pat. No. 4,203,134.

The composite video signal produced by FM demodulator 58 is separated into luminance and chrominance components by means of a variable center frequency comb filter 60. Examples of filters of this type are given in U.S. Pat. No. 3,966,610 which issued to H. Kawamoto Dec. 7, 1976, and the U.S. Patent Application of T. J. Christopher and L. L. Tretter entitled "VIDEO PROCESSING SYSTEM INCLUDING COMB FILTERS", Ser. No. 966,512 which was filed Dec. 4, 1978 and issued Mar. 25, 1980, as U.S. Pat. No. 4,195,309.

The reason for using a variable comb filter (rather than one of fixed frequency) is to maximize filtering efficiency by changing the filter center frequency in accordance with time base errors which may be present in the video signal. This requires supplying a relatively high frequency control signal to filter 60 to operate clock drivers that control the rate of charge transfer in a CCD delay line in the filter. This high frequency signal is one of five output signals produced by timing signal generator 62.

Generator 62 has input terminals 64 and 66 for receiving, respectively, the BSC chrominance signal and the luminance signal produced by filter 60 and outputs 68, 70, 72, 74 and 76 for producing, respectively, a line frequency signal $f_H$, a burst key signal BK, a regenerated reference subcarrier signal $F_{BSC}$ (1.52 MHz), a reference signal of four times subcarrier frequency $4f_{BSC}$ and a reference signal of eight times subcarrier frequency $8f_{BSC}$. Terminal 66 is connected to the input of sync detector 80 which detects horizontal synchronizing pulses present in the luminance signal and supplies synchronizing pulses at the horizontal line rate $f_H$ to output terminal 68 and to the input of burst key generator 82. Generator 82 produces an output burst key pulse, BK, during the burst interval of the horizontal synchronizing period. The burst key pulse is supplied to the enabling input terminal of phase detector 84 and to output terminal 70.

The output of detector 84 is coupled via a cascade connection of low pass filter 86, voltage controlled oscillator 88, divider 90 and divider 92 to one of its two phase comparison inputs the other of which connects to terminal 64 thereby forming a plural output burst keyed multiplying phase locked loop. The outputs of VCO 88, divider 90 and divider 92 are connected, respectively, to terminals 76, 74 and 72.

Phase detector 84 compares the phase of the burst component of the chrominance signal supplied to terminal 64 with the divided output of VCO 88 and produces an error signal which is filtered by filter 86 (which may be simply an error voltage holding capacitor) and applied as a negative feedback signal to VCO 88 for minimizing any phase errors. Since the output of VCO 88 is divided by two by divider 90 and divided by four by divider 92, VCO 88 thus operates (when phase locked) at a frequency of eight times the burst frequency and this high frequency signal is supplied via terminal 76 to the center frequency control input of comb filter 60. Since VCO 88 is always phase locked to a multiple (X8) of the buried subcarrier burst signal any time base errors in the burst are present in the VCO output. The feedback to filter 60 is of a sense to change its center frequency by an amount such that both its luminance and chrominance pass bands remain centered about the luminance and chrominance spectra when time base errors occur thereby maximizing filtering efficiency. Terminals 74 and 72 being connected to the outputs of dividers 90 and 92, respectively, receive regenerated buried subcarrier reference frequencies of $4f_{BSC}$ and $f_{BSC}$, respectively.

It is a feature of the video disc player of FIG. 5 that timing signal generator 62 provides in one unified arrangement a source of five timing signals which are used for controlling three functions of the player. One signal is supplied to filter 60 as noted above for maximizing filtering efficiency. As will now be discussed in detail, three of the signals are supplied to transcoder 90 for controlling chrominance phase conversion and a further signal is supplied to a time base corrector 100 for controlling both time base correction and frequency conversion of the chrominance signal.

Transcoder 90 is similar to the transcoder of FIG. 3 but has been modified in two respects. One of the modifications comprises the addition of means for periodically inhibiting the operation of switch 30. The other comprises means for initializing divider 24. Switch 30 is inhibited periodically by AND gate 35 which has been interposed between the output of divider 24 and the control or enabling input of switch 30 and is supplied with half line rate control signals $f_H/2$ from the output of a further divider 36. The input of divider 36 is connected to a further transcoder input terminal 38 which is connected to output terminal 68 where the line rate signal $f_H$ is produced. Initialization (or periodic presetting) of divider 24 is provided by means of an added pulse shaper 37 (e.g. a monostable multivibrator) which is connected at its input (via added terminal 40) to output terminal 72 of generator 62 and at its output to a preconditioning input (i.e., a jam, set or reset input) of divider 24. Preferably, divider 24 is of the type which may be preconditioned (i.e., directly set or reset) without regard to the state of the signal at its clock input.

In operation of the portion of the player described thus far, comb filter 60 and timing signal generator 62 produce output signals as previously described. The chrominance output signal is supplied to input 16 of transcoder 90 and the quadrupled regenerated reference buried subcarrier ($4f_{BSC}$) signal is supplied to terminal 20. Inverting amplifier 32, the two sample and hold circuits 10 and 34 and phase adjuster 22 operate as previously described with circuit 10 producing non-inverted samples of the chrominance signal and circuit 34 producing inverted samples of the chrominance signal, each sample instant being taken at a time equivalent to the U and V axis crossings whereby every other sample represents a U (or $-$U) sample and intermediate samples represent V (or$-$V).

The horizontal line rate signal $f_H$ is divided by two in divider 36 which supplies a half line rate signal $f_H/2$ to AND gate 35. During alternate television lines AND gate 35 is primed to supply the double subcarrier reference frequency signal $2f_{BSC}$ to switch 30 and during intermediate lines it blocks the $2f_{BSC}$ signal and holds switch 30 in its normal (N) position. Accordingly, during the intermediate lines only the samples from circuit 10 are supplied to filter 14 and since their polarity is unchanged, filter 14 provides a reconstructed chrominance signal to output 18 which is identical to that supplied to input 16. During the alternate lines however, when gate 35 is enabled, switch 30 alternately selects inverted and non-inverted samples of the chrominance signal and so, for the reasons previously explained, the phase of one of the U or V chrominance components at the output of filter 14 is reversed relative to its phase at input terminal 16.

Selection of which of the U and V components is phase reversed on alternate lines is important for the proper reproduction of a PAL format output signal. As previously mentioned in the discussion of FIG. 1, one may insure that a desired one of the components is phase reversed by proper initialization of divider 24. Of the two methods of performing the initialization previously mentioned, it is preferred to do it periodically. A preferred rate of periodic preconditioning is once during each subcarrier cycle. In transcoder 90 this function is provided by pulse shaper 37 which, illustratively, may be a differentiator or a monostable multivibrator.

Recall that the $f_{BSC}$ signal at terminal 72 is phase locked to the burst component of the chrominance signal and this reference is continuously available. Pulse shaper 37 thus continuously produces pulses having a fixed relation to burst. These pulses are applied as preset signal to divider 24 such that the initial state of divider 24 causes switch 30 to select the output of sample and hold circuit 10 when the V component is at an axis crossing. Thus the first clock signal supplied to divider 24 after initialization will cause switch 30 to select the V component when the U component is zero. If divider 24 should ever fail to toggle for an odd number of clock signals, pulse shaper 37 will immediately resynchronize it when its toggle operation returns to normal. (Failure to toggle for an even number of clock signals, of course, does not result in loss of synchronization for obvious reasons).

The remaining elements of FIG. 5 comprise a time base corrector and frequency translation circuit 100 and a summing circuit 110. Circuit 100 has an input terminal 101 for receiving the burst key signal BK from timing signal generator 62, a second input terminal 102 for receiving the PAL format chrominance signal produced at output terminal 18 of transcoder 90 and an output terminal for supplying a frequency translated and time base corrected PAL standard output signal to one input of summing circuit 110. The other input of circuit 110 is connected to receive the luminance output signal produced by filter 60 to thereby a composite video output signal of PAL format at the output of circuit 110.

Recall from the previous discussion that the player video output signal includes time base errors and that one of the three functions of timing signal generator 62 is to provide an $8Xf_{BSC}$ signal containing those time base errors to the comb filter 60 to vary its center frequency in proportion to the errors thereby maximizing filtering efficiency. This process, of course, has no effect at all on the time base errors and they are present at all five outputs of generator 62 as well as in the chrominance signal produced by filter 60. Since the chrominance errors and timing signal errors vary together, however, there is no interference or detrimental effect on the operation of transcoder 90. The significance of this is that where the transcoder of the present invention is used in video apparatus of any type (tape, disc, studio, transmission) which includes time base correction means one has two options. The first is that where the transcoder precedes the time base corrector in the video processing chain, it should be supplied with timing signals having time base errors proportional to the color burst errors in the chrominance signal. The other option is that where the chrominance signal is time base corrected (or otherwise stabilized or resynchronized) prior to application to the chrominance transcoder, the timing signals supplied to the transcoder should be derived from the corrected burst signal. If one observes these two principles, then the transcoder will introduce minimal differential phase errors in the video processing chain thereby providing maximal color purity. This is particularly important with regard to NTSC transcoding since in the NTSC system differential chrominance subcarrier phase errors represent changes in hue which can not be averaged out optically or electronically as in the PAL transmission system. Differential amplitude errors, a source of the Hanover bar or Venetian Blind effect in the PAL system, may be minimized if proper care is taken in balancing the gain in the U and V signal paths through the transcoder as previously mentioned.

Turning now to the details of circuit 100, phase detector 103 when enabled by the BK signal, compares the output of a PAL standard oscillator 104 (about 4.43 MHz) with a band pass filtered product of the burst component of the transcoded chrominance signal at terminal 102 multiplied by the output of a voltage controlled oscillator 105 having a nominal center frequency equal to the sum of the buried subcarrier frequency (1.52 MHz) and the PAL frequency (4.43 MHz). If a time base error exists detector 103 supplies a correction signal via low pass filter 106 to oscillator 105 in a sense to correct it. The multiplier (108) may be a conventional balanced modulator or mixer and the pass band of the band pass filter 107 should be centered at the PAL subcarrier standard of 4.43 MHz.

The transcoder of FIG. 6 is similar to that of FIG. 1 but includes three modifications to provide conversion of a chrominance input signal having NTSC burst phasing. Two of the modifications are the same as in transcoder 90 of FIG. 5, namely, the addition of an AND gate 35 and divider 36 for periodically inhibiting polarity reversals of the samples every other horizontal line and the addition of a subcarrier frequency pulse shaper circuit 37 for periodically presetting or initializing divider 24 to assure that inverter 12 is properly synchronized so as to invert only the V component of the chrominance input signal.

The third modification comprises a switch 601 and a phase shift circuit 602 interposed between chrominance input terminal 16 and the input of sample and hold circuit 10 and controlled by a burst key signal supplied to a further input terminal 603 so as to shift the phase of the chrominance signal by 45° during the color burst interval (but not during the active video span interval). Preferably, the 45° shift is in a sense to rephase burst at an angle of 135° relative to the B-Y color difference signal axis as prepared by Carnt, et al. In this way the NTSC chrominance signal, insofar as burst phasing is concerned, is converted to a Carnt, et al. type of signal prior to chrominance conversion to PAL format. With the exception of this periodic phase shift during the burst interval, the circuit operation is the same as discussed in connection with FIG. 5.

The phase shift circuit in this example is implemented by connecting one pole A of switch 601 directly to chrominance input terminal 16. The other pole B is coupled to terminal 16 via the 45° phase shift network 602. Switch 601 receives burst key signals supplied to terminal 603 from a source (not shown) and when the key signal is present couples pole B to the input of sample and hold circuit 10. Where the key signal is absent switch 601 couples pole A to circuit 10 whereby the burst component of the NTSC signal (which normally has no V component) is converted to one of the Carnt, et al. standard (which has equal U and V components) which, in turn, is processed by the remainder of the circuitry to PAL form as previously described.

It is not necessary that the burst key signal supplied to terminal 603 include only the burst interval. It may, for example, extend throughout the entire horizontal synchronizing interval, if desired, since information is not visibly displayed on a television monitor during that period of time. Phase shift network 602 may be a conventional lead or lag network or it may be a delay line of a length equal to one-eighth of the subcarrier period. In either case, the phase shift is necessarily a function of the subcarrier frequency so that appropriate changes or adjustments should be made to accommodate different subcarrier frequencies.

Subcarrier frequency conversion may be performed by conventional heterodyning circuits prior to application of the chrominance signal to terminal 16, or between the output of switch 601 and the input of circuit 10 or it may be done after chrominance conversion (i.e., at output terminal 18 as in FIG. 5). For any one of these three options the parameters of elements 602,22,37 and 14 should be chosen to conform to the subcarrier frequency so that all phase shifts and pass bands conform to the requirements previously described.

FIG. 7 illustrates how the transcoder of FIG. 6 may be modified for converting a PAL format chrominance input signal to an NTSC type of chrominance output signal. As previously explained, the actual subcarrier frequency choice is arbitrary, that is, it may be 4.43 MHz (PAL), 3.58 MHz (NTSC) or any other suitable value (e.g., 1.52 MHz as in the Carnt, et al. standard). The modification comprises connecting the input of pole A and phase shifter 602 to output 18 and applying the PAL chrominance input signal to the input of sample and hold circuit 10.

In operation, the transcoder elements between terminals 16 and 18 function as previously described to reverse the phase of the V chrominance component on alternate lines. Since the V component itself alternates from line-to-line in the PAL system, the signal produced at output terminal 18 is therefore converted to one of the Carnt, et al. type of burst phasing. The rearrangement of switch 601 and circuit 602 shifts the phase of the burst 45° into alignment with the -(B-Y) axis (NTSC standard) without altering the "de-switched" chrominance phase during the active scan interval.

The principles of the invention, while illustrated in connection with processing analog QAM signals, apply also to the transcoding of digitized QAM signals. In FIG. 1, for example, the function of sample and hold circit 10 may be performed with digital means such as a data latch, register, analog-to-digital converter or the like. Inversion of the sampled digital QAM signal may readily be performed, for example, by complementing the sign bit of the sample (where the data is in sign-magnitude form) so that inverter 12 could be implemented by means of an exclusive-OR gate. Other changes and modifications may be made, such as replacing sample and hold circuit 10 with an analog-to-digital converter arranged to sample the QAM signal at the times shown and described in connection with FIG. 4 and inverting the digital samples with suitable arithmetic means (e.g., the X-OR gate previously mentioned) and then applying the signal to a digital-to-analog converter (rather than filter 14) for purposes of reconstruction of the QAM signal.

FIG. 8 shows how the transcoder of FIG. 1 may be modified as described above. As may be seen, elements 10, 12 and 14 are replaced by an analog-to-digital converter 810, a sign bit inverter 812 and a digital-to-analog converter 814 which perform analogous functions to the replaced elements. Where the QAM signal is a television chrominance signal means (such as an AND gate and divider, etc.) should be provided for periodically inhibiting operation of the sign bit inverter as in the previously discussed examples of the invention.

What is claimed is:

1. A transcoder for reversing the phase of one of two signal components of a quadrature amplitude modulated subcarrier, comprising:

first means for producing sequential samples of the amplitude of said subcarrier at times corresponding to each axis crossing of each of said signal components;

second means for inverting the polarity of alternate ones of said samples; and third means for reconstructing said subcarrier from the inverted and non-inverted samples without alteration of the sequence thereof.

2. A transcoder for reversing the phase of one of two signal components of a quadrature amplitude modulated subcarrier; comprising:

first means for producing samples of the amplitude of said subcarrier at times corresponding to each axis crossing of each of said signal components;

second means for inverting the polarity of alternate ones of said samples;

third means for reconstructing said subcarrier from the inverted and non-inverted samples; and fourth means responsive to a control signal supplied thereto for inhibiting the operation of said second means when said control signal is of a first level and enabling operation of said second means when said control signal is of a second level.

3. A transcoder as recited in claim 2 further comprising:

fifth means for generating said control signal and for changing the level thereof periodically, the period of said control signal between each change in level being substantially greater than the period between successive ones of said axis crossings.

4. A transcoder as recited in claim 1 wherein said first means comprises:

sample and hold means having a first input for receiving said quadrature amplitude modulated input signal, a second input for receiving a sampling signal and an output for producing said samples; and means for supplying said sampling signal to said sample and hold means at a rate of four times the frequency of said subcarrier.

5. A transcoder as recited in claim 4 further comprising:

means for dividing said sampling signal by a factor of two and for supplying the resultant half rate signal to said second means for controlling the inversion of polarity of said alternate ones of said samples.

6. A transcoder as recited in claim 1 wherein said quadrature amplitude modulated signal comprises the chrominance component of a color television signal and further comprising:

means responsive to a line synchronizing component of said television signal for inhibiting operation of said second means during alternate line intervals.

7. A transcoder for reversing the phase of one of two signal components of a quadrature amplitude modulated subcarrier, comprising:

first means for producing samples of the amplitude of said subcarrier at times corresponding to each axis crossing of each of said signal components;

second means for inverting the polarity of alternate ones of said samples;

third means for reconstructing said subcarrier from the inverted and non-inverted samples; and wherein said second means comprises:

circuit means for producing inverted samples;

switch means responsive in a first position for coupling said samples produced by said first means to said third means and responsive in a second position for coupling said inverted samples between said circuit means and said third means; and means for changing the position of said switch means at a rate equal to half the sampling rate.

8. A transcoder as recited in claim 7 where said circuit means comprises:

an inverting amplifier connected between an output of said first means and an input of said switch means.

9. A transcoder as recited in claim 7 wherein said first means comprises a first sample and hold circuit and said circuit means comprises:

an inverting amplifier for inverting said quadrature amplitude modulated subcarrier; and a second sample and hold circuit synchronized with said first sample and hold circuit for producing inverted samples of the output of said inverting amplifier for application to said switch means.

10. In video reproducer apparatus of the type including a source of composite video signals, a filter for separating said composite signal into a luminance component and a chrominance component, said chrominance component comprising a pair of quadrature related color difference components U and V of non-alternating phase and a burst component having a phase angle of substantially 45° relative to one of said components, a chrominance transcoder for converting said chrominance signal to PAL form and circuit means for combining the luminance and converted chrominance signals to provide a PAL type output signal, the improvement for providing said conversion without demodulation to base band wherein said chrominance transcoder comprises:

means for sampling said chroninance input signal at a rate of four times a given subcarrier frequency, the sampling instants being taken at times corresponding to the axis crossings of said U and V components;

means for reversing the polarity of alternate samples during every other horizontal scanning interval; and signal from the inverted and non-inverted samples.

11. In video reproducer apparatus of the type including a source of composite video signals, a filter for separating said composite signal into a luminance component and a chrominance component, said chrominance component comprising a pair of quadrature related color difference components U and V of non-alternating phase and a burst component having a phase angle of substantially 45° relative to one of said components, a chrominance transcoder for converting said chrominance signal to PAL form and circuit means for combining the luminance and converted chrominance signals to provide a PAL type output signal, the improvement for providing said conversion without demodulation to base band wherein said chrominance transcoder comprises:

means for sampling said chrominance input signal at a rate of four times a given subcarrier frequency, the sampling instants being taken at times corresponding to the axis crossings of said U and V components;

means for reversing the polarity of alternate samples during every other horizontal scanning interval;

means for reconstructing a chrominance output signal from the inverted and non-inverted samples; and a frequency transcoder connected in cascade with said chrominance transcoder.

12. In a video reproducer apparatus of the type including a source of composite video signals, a filter for separating said composite signal into a luminance component and a chrominance component, said chrominance component comprising a pair of quadrature related color difference components U and V of non-alternating phase and a burst component having a phase angle of substantially 180° relative to one of said components, a chrominance transcoder for converting said chrominance signal to PAL form and circuit means for combining the luminance and converted chrominance signals to provide a PAL type output signal, the improvement for providing said conversion without demodulation to base band wherein said chrominance transcoder comprises:

means for shifting the phase of said burst component of said chrominance signal substantially 45° to provide a modified chrominance signal;

means for sampling said modified chrominance signal, the sampling instants being taken at times corresponding to the axis crossings of said U and V components;

means for reversing the polarity of alternate samples during every other horizontal scanning interval; and means for reconstructing a chrominance output signal from the inverted and non-inverted samples.

13. In a video reproducer apparatus of the type including a source of composite video signals, a filter for separating said composite signal into a luminance component and a chrominance component, said chrominance component comprising a pair of quadrature related color difference components U and V of non-alternating phase and a burst component having a phase angle of substantially 180° relative to one of said components, a chrominance transcoder for converting said chrominance signal to PAL form and circuit means for combining the luminance and converted chrominance signals to provide a PAL type output signal, the improvement for providing said converstion without demodulation to base band wherein said chrominance transcoder comprises:

means for shifting the phase of said burst component of said chrominance signal substantially 45° to provide a modified chrominance signal;

means for sampling said modified chrominance signal, the sampling instants being taken at times corresponding to the axis crossings of said U and V components;

means for reversing the polarity of alternate samples during every other horizontal scanning interval;

means for reconstructing a chrominance output signal from the inverted and non-inverted samples; and a frequency transcoder connected in cascade with said chrominance transcoder.

14. A chrominance signal transcoder comprising:

first means for producing sequential samples of the amplitude of a chrominance input signal at times corresponding to each axis crossing of each of the color difference signal components of said chrominance signal;

second means for inverting the polarity of alternate ones of said samples;

third means for inhibiting the operation of said second means during every other line scanning interval associated with said chrominance signal; and fourth means for reconstructing said chrominance signal from said samples without alteration of the sequence thereof.

15. A chrominance signal transcoder as recited in claim 14 further comprising:

means for synchronizing the operation of said second means with a reference signal.

16. A chrominance signal transcoder comprising:

first means for producing samples of the amplitude of a chrominance signal at times corresponding to each axis crossing of each of the color difference signal components of said chrominance signal;

second means for inverting the polarity of alternate ones of said samples;

third means for inhibiting the operation of said second means during every other line scanning interval associated with said chrominance signal;

fourth means for reconstructing said chrominance signal from said samples; and phase shifting means connected in cascade with said transcoder for imparting a phase shift of substantially 45° to the burst component of said chrominance signal.

17. A chrominance signal transcoder comprising:

first means for producing samples of the amplitude of a chrominance signal at times corresponding to each axis crossing of each of the color difference signal components of said chrominance signal;

second means for inverting the polarity of alternate ones of said samples;

third means for inhibiting the operation of said second means during every other line scanning interval associated with said chrominace signal;

fourth means for reconstructing said chrominance signal from said samples; and phase shifting means for imparting a phase shift of substantially 45° to the burst component of the reconstructed chrominance signal.

* * * * *